June 15, 1937. C. A. BRETHEN 2,083,594
ELECTRIC LIGHTING SYSTEM FOR TOYS
Filed Jan. 2, 1934 2 Sheets-Sheet 2
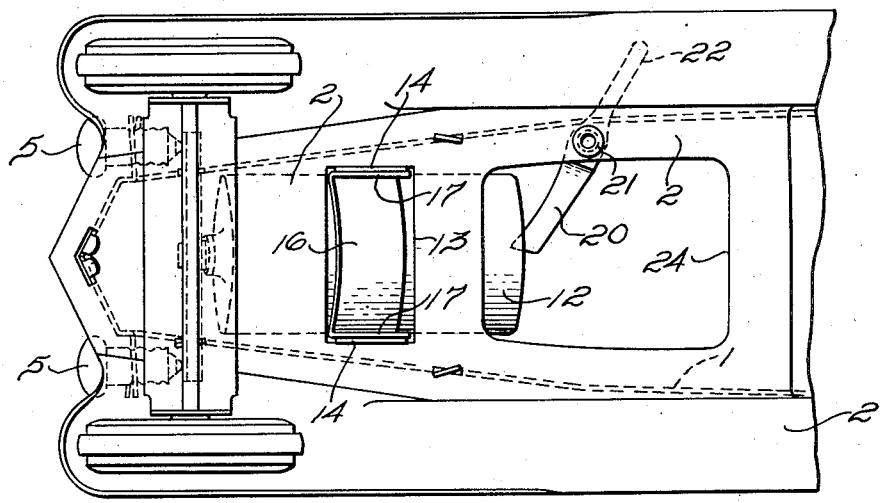
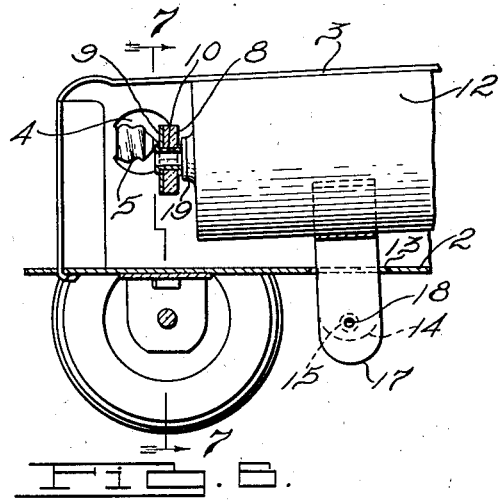
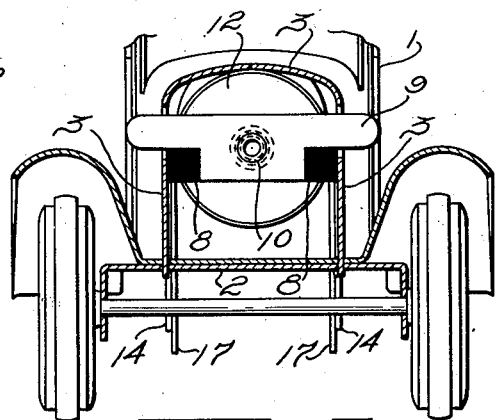
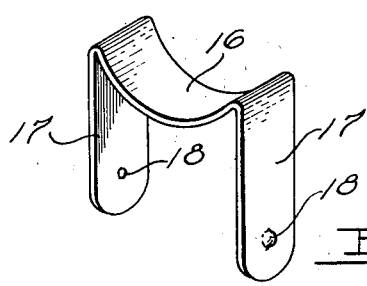
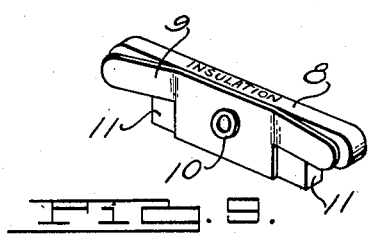
INVENTOR
Charles A. Brethen
BY
ATTORNEY Patented June 15, 1937

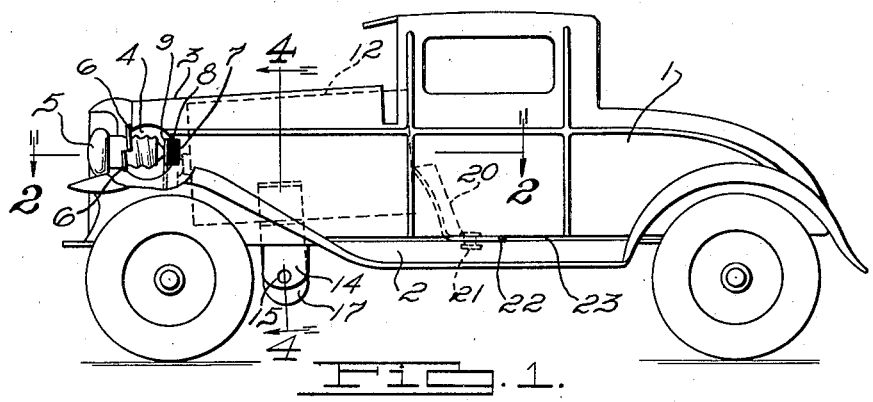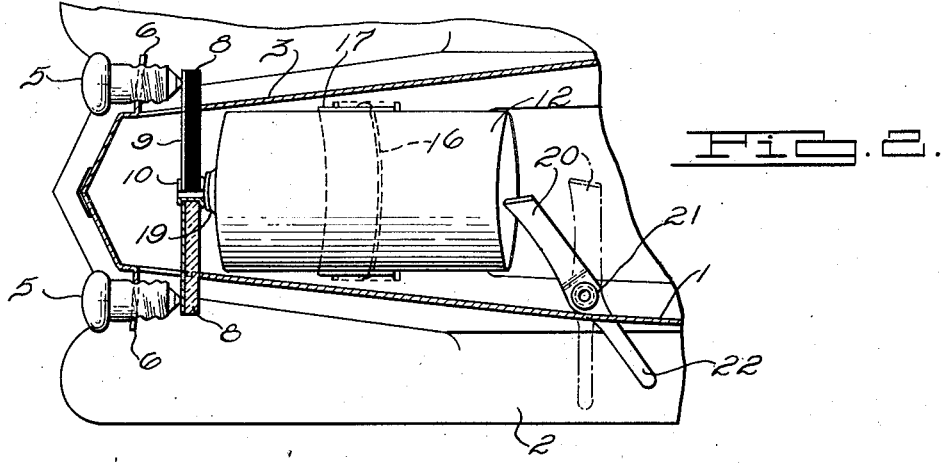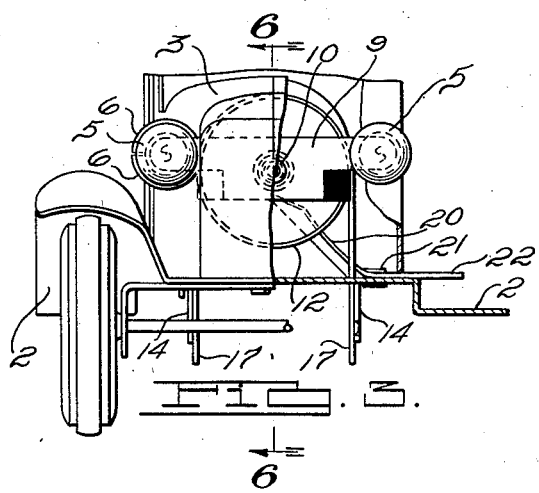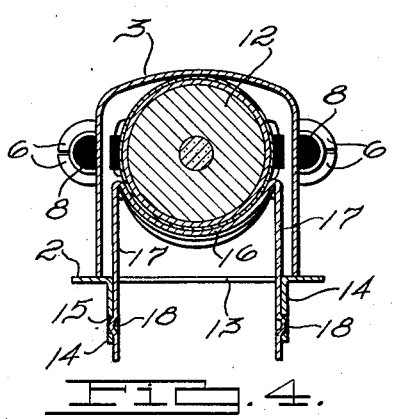

2,083,594

UNITED STATES PATENT OFFICE 2,083,594

ELECTRIC LIGHTING SYSTEM FOR TOYS

Charles A. Brethen, Wyandotte, Mich., assignor to All Metal Products Company, Wyandotte, Mich., a corporation of Michigan Application January 2, 1934, Serial No. 704,926

4 Claims. (Cl. 46—203)

This invention relates to electric lighting systems for toys and the object of the invention is to provide an electric lighting system particularly adapted for use on a toy truck or automobile and arranged so that the lights may be readily turned off or on.

Another object of the invention is to provide an electric lighting system for toy automobiles including a pair of headlights and a transverse contact member mounted transversely of the hood in apertures provided therefor, the contact member being provided with an insulating backing and the headlights being threadable through brackets to hold the contact member in place in the hood apertures.

Another object of the invention is to provide a means for holding a battery in place in the hood, said means being readily removable to allow removal and replacement of the battery.

A further object of the invention is to provide an electric lighting system for toys of the automotive type including a hood having a pair of apertures on opposite sides thereof, a fiber strip carrying a metal contact strip positioned in the hood and extending through the apertures, a contact extending through the fiber strip at the center and a battery supported in position in the hood and engaging the contact, the hood being provided with brackets on opposite sides and lamps being threaded through the brackets into engagement with the contact strip to hold the contact strip and fiber strip in fixed position in the apertures.

Another object of the invention is to provide a switch arm which may be moved into contact with the battery to complete the circuit through the headlights and through the body of the toy.

These objects and the several novel features of the invention are hereinafter more fully described and claimed and the preferred form of construction by which these objects are attained is shown in the accompanying drawings in which—

Fig. 1 is a side elevation of a toy automobile equipped with my electric lighting system.

Fig. 2 is an enlarged section taken on line 2—2 of Fig. 1.

Fig. 3 shows only the essential parts of the lighting system in the assembled relation.

Fig. 4 is a section taken on line 4—4 of Fig. 1.

Fig. 5 is a bottom plan view of the forward end of the toy automobile.

Fig. 6 is a section taken on line 6—6 of Fig. 3.

Fig. 7 is a section taken on line 7—7 of Fig. 6.

Fig. 8 is a perspective view of the battery supporting clip.

Fig. 9 is a perspective view of the contact strip and insulated backing.

In Fig. 1 I have shown the electric lighting system as applied to a toy automobile which may be of any type desired. In this case the toy automobile comprises a body 1 which is mounted on a chassis portion 2 in which the fenders and running boards are formed as an integral part of the chassis. The body 1 is provided with a hood portion 3 and apertures 4 are formed in opposite sides of the hood portion. The metal displaced in forming these apertures is utilized to provide supports for the electric light bulbs 5 and for this purpose the supporting brackets for the electric light bulbs are made annular in form and the ends are split and bent in opposite directions to provide the bracket portions 6 shown in Figs. 1, 2 and 3. By this arrangement the electric light bulbs may be readily threaded into the brackets 6.

When the toy automobile radiator is formed from a separate stamping, these brackets 6 may be made integral with the radiator portion while in the construction shown they are integral with the hood portion. The apertures 4 are each provided with a notch 7 at the rear and a strip of insulation 8 is provided shown in Figs. 1, 7 and 8 to which a metal contact strip 9 is secured by the eyelet 10 extending through the strip, as shown in Fig. 6. The insulating member 8 is provided with shoulders 11 at opposite sides and this member 8 with the contact strip 10 may be inserted through the apertures 4 transversely of the automobile hood to position the shoulders 11 against the sides of the hood 3, as shown in Fig. 7. This allows the narrow ends of the insulating strip to rest in the notches 7 and, at the same time, the contact strip 9 is insulated from the hood. With the insulating strip in position, the electric light bulbs 5 may be threaded through the brackets 6 against the opposite ends of the contact strip thus firmly engaging the contact strip in the notches 7.

It will be noted from Fig. 9 that the ends of the spring metal contact strip 9 are bent outwardly and normally spaced from the insulation strip 8. These out-turned ends have a double function in that, as the electric light bulbs are threaded into contact in position in its notches and, at the same time, exert a pressure against the bases of the electric light bulbs to hold them firmly in position in the threaded brackets 6 and by maintaining a pressure on these electric light bulbs the electric light bulbs will not jar loose and unthread from the brackets. Thus, when the electric light bulbs 5 are threaded in position, a firm electrical spring contact is maintained with the bases of the bulbs, the bulbs are held in position in the brackets and the insulating strip is held in position in its notches by this construction.

The battery used in connection with this device is an electric flashlight cell 12, shown more particularly in Figs. 2, 4 and 6. This flashlight cell is positioned in the hood and against the top thereof as indicated in dotted lines in Fig. 1. In order to support the electric flashlight cell in position, the chassis 2 shown in Fig. 5 is provided with an aperture 13 and the metal displaced in making this aperture is utilized to provide the depending brackets 14, shown in Figs. 4, 5 and 6. These brackets 14 are each provided with an aperture 15 and a clip is provided, as shown in Fig. 8, having a semi-circular portion 16 provided with two depending arms 17. Each arm is provided with a raised boss 18 and the clip is inserted through the aperture 13 in the chassis 2 and against the bottom of the battery, as indicated more particularly in Figs. 4 and 6, to hold the battery against the top of the hood 3.

When the battery is moved against the top of the hood the bosses 18 on the arms 17 spring into the apertures 15 on the depending brackets 14 and thus support the battery in position against the top of the hood. At the same time, the battery terminal 19 contacts the eyelet 10 in the insulating strip, as shown in Figs. 2 and 6.

As shown in Figs. 2 and 5, a contact lever 20 is pivotally mounted at 21 on the chassis 2 and the end 22 thereof extends through a space 23 between the body and chassis, as shown in Fig. 1. By moving the contact lever to the position shown in full lines in Fig. 2 the lever is brought into contact with the zinc bottom of the battery. When this has been done the current flows through the battery terminal 19, eyelet 10, contact strip 9, through the electric light bulbs to the brackets 6 and thence through the body and chassis and contact lever 20 back to the battery thus completing the circuit and lighting the electric light bulbs 5. As soon as the lever is moved to the dotted position shown in Fig. 2, the circuit is broken and the lights are turned out. It will be noted in turning the lever that the tendency is to push the battery forward into firm contact with the eyelet 10 in the insulating strip so that the electric light bulbs will readily light as long as any charge remains in the battery.

To allow removal or replacement of the battery, it is only necessary to press the lower ends of the clip arms 17 together as will be understood from Fig. 4, at which time, the clip may be removed through the aperture 13 in the chassis and the battery may then be removed through the aperture 24 in the chassis and as readily replaced.

From the foregoing description it becomes evident that the device is very simple and efficient in operation, will not easily get out of order, is composed of few parts and is of consequent low manufacturing cost and provides a device which accomplishes the objects described.

Having thus fully described my invention, its utility and mode of operation, what I claim and desire to secure by Letters Patent of the United States is—

1. In an electric lighting system for toy automobiles having a hood and a chassis member, a pair of brackets struck out from opposite sides of the hood, an insulating strip positioned in the apertures formed by the struck out metal, a spring metal contact strip carried by the insulating strip, the ends of the contact strip being sprung out away from the insulating strip, a pair of electric light bulbs threaded through the brackets and engaging the spring ends of the contact strip to apply pressure to the insulating strip to hold it in position against the rear edges of the apertures, a contact extending from the contact strip through the insulating strip, an electric battery positioned against the top of the hood, a clip engaging the battery and holding it against the top of the hood, the battery being provided with a terminal normally engaging the aforesaid contact and a pivoted lever carried by the toy automobile and turnable into engagement with the end of the battery opposite the aforesaid terminal.

2. In an electric lighting system for toy automobiles having a hood and a chassis member, a pair of brackets struck out from opposite sides of the hood, an insulating strip positioned in the apertures formed by the struck out metal, a contact strip carried by the insulating strip and having out-turned spring ends, a pair of electric light bulbs threaded through the brackets and engaging the out-turned spring ends of the contact strip to apply pressure to the insulating strip to hold it in position against the rear edges of the apertures, a contact extending from the contact strip through the center of the insulating strip, an electric battery positioned against the top of the hood, the chassis being provided with an opening, a removable clip positioned in the opening and engaging the battery to hold it against the top of the hood, the battery engaging the contact at one end and a lever pivotally supported on the chassis and movable into engagement with the opposite end of the battery.

3. In an electric lighting system for toy automobiles including a hood, a pair of brackets struck out from opposite sides of the hood, the brackets being shaped so that an electric light bulb may be threaded therethrough, an insulating strip positioned in the apertures formed by the struck out metal, a spring metal contact strip carried by the insulating strip and having out-turned spring ends spaced from the insulating strip, a pair of electric lights bulbs threaded through the brackets and engaging the out-turned spring ends of the contact strip to firmly hold the insulating strip in position in the apertures, a contact extending through the contact strip and insulating strip, a battery supported in the automobile hood and having a terminal extending into engagement with the contact and a switch lever movable into engagement with the end of the battery opposite the contact.

4. In an electric lighting system for toy automobiles including a hood, a pair of brackets struck out from opposite sides of the hood, an insulating strip positioned in the apertures formed by the struck out metal, a spring metal contact strip mounted on the face of the insulating strip and having out-turned spring ends normally spaced from the insulating strip, a pair of electric headlights threaded through the brackets and engaging the out-turned spring ends of the contact strip to hold the insulating strip in position in the apertures.

CHARLES A. BRETHEN.